United States Patent Office 3,840,640
Patented Oct. 8, 1974

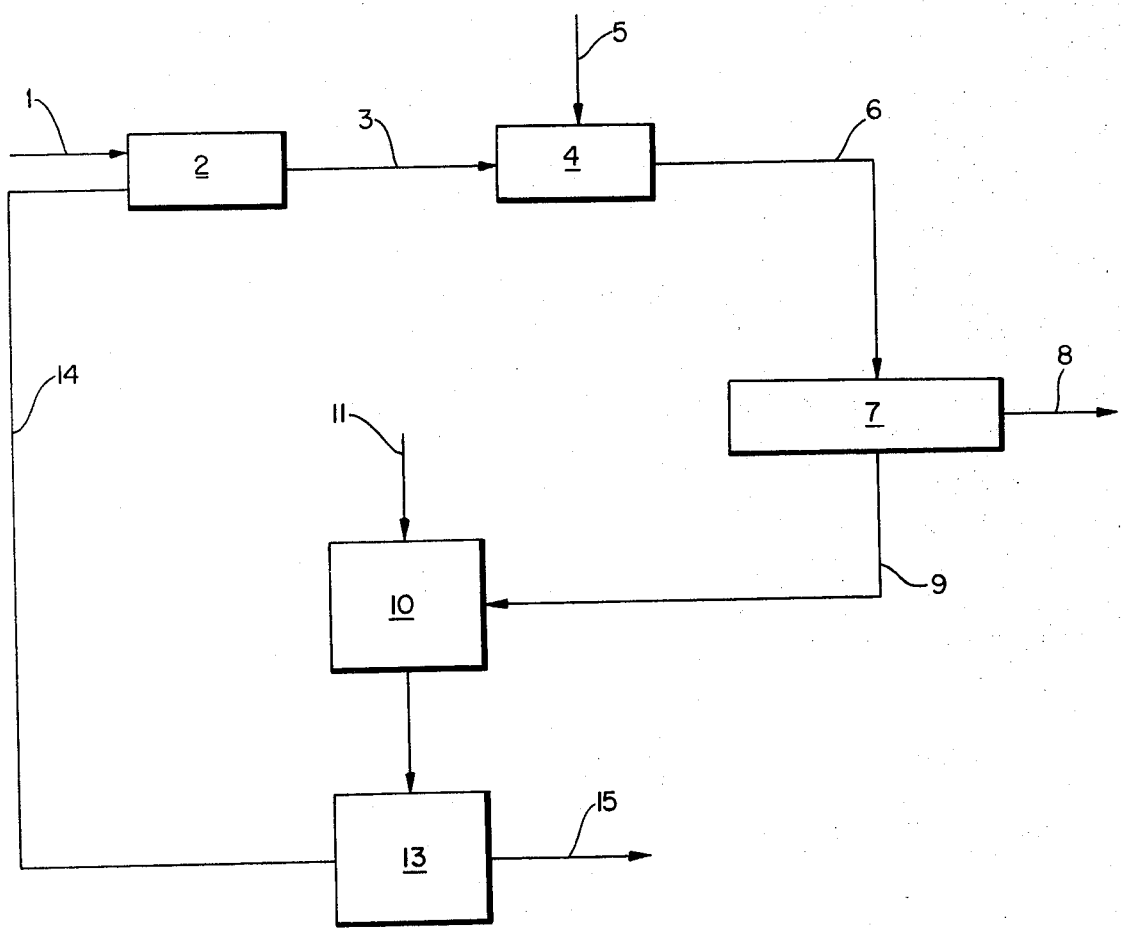

3,840,640
PRODUCTION OF FLUORIDE-FREE NITRATES
Erhart K. Drechsel, Houston, Tex., assignor to
Pennzoil Company, Shreveport, La.
Filed Aug. 28, 1972, Ser. No. 284,045
Int. Cl. C22b *3/00, 29/00;* C01f *1/00, 5/00, 11/00*
U.S. Cl. 423—167                         13 Claims

ABSTRACT OF THE DISCLOSURE

There is disclosed a method for the production of alkali metal nitrates and phosphoric acid from phosphate rock, wherein the process is conducted in the substantial absence of atmospheric, stream and product fluorine pollution, which comprises reacting a fluoride-containing phosphate rock with phosphoric acid which contains some alkali metal ions, in a first stage to form a slurry of a calcium phosphate, reacting this intermediate in a second stage with a sulfate salt of the formula $R_2SO_4$, wherein R is alkali metal or one R is alkali metal and the other R is hydrogen, wherein the reaction is conducted in the substantial absence of strong mineral acid. After the reaction is completed, gypsum solids are separated which contain insoluble fluorides and yield a resulting filtrate comprising primarily phosphoric acid and alkali metal dihydrogen phosphate. The resulting filtrate is then reacted with nitric acid to form alkali metal nitrates in admixture with phosphoric acid which can be separated. In a preferred cyclic process, a portion of the phosphoric acid is recycled for reaction with the rock in the first stage, and the alkali metal nitrates are recovered.

BACKGROUND OF THE INVENTION

Field of the Invention

This invention relates to a method for the operation of an alkali metal nitrate/phosphoric acid plant under such conditions that fluoride pollution is minimized so as to recover substantially fluoride-free products. More particularly, the invention relates to a method for the production of alkali metal nitrates and phosphoric acid as separate products by the reaction of phosphate rock with certain acidulation reactants which serve to concentrate the fluorides in the gypsum cake in an insoluble form.

DESCRIPTION OF THE PRIOR ART

Typical phosphoric acid plants are currently operated utilizing a basic and well known process for the acidulation of phosphate rock by reaction of the rock with sulfuric acid to form phosphoric acid with subsequent reaction of the phosphoric acid, with for example ammonia to produce monoammonium phosphate (MAP) and diammonium phosphate (DAP). The phosphoric acid formed in this process is called wet process phosphoric acid and is usually manufactured by treating a phosphate rock (usually fluorapatite) with the sulfuric acid in a reaction which produces phosphoric acid containing approximately 30 weight percent $P_2O_5$. In this reaction, a by-product is gypsum having the chemical formula $CaSO_4 \cdot 2H_2O$. A large portion of the fluorine contained in the phosphate rock is usually evolved as a gaseous fluoride into the atmosphere. After filtration of the gypsum, the phosphoric acid is frequently evaporated to higher strength to obtain higher $P_2O_5$ concentrations which may then be reacted with ammonia if desired and used as a fertilizer. In many operations the usual procedure for disposal of the gypsum is to slurry the gypsum with water and pump the slurry to a large settling pond which is usually formed by building earthen dikes around the perimeter of the pond to retain the gypsum and allow it to settle out therein. Under present practice, the gypsum so disposed is not suitable for profitable use so it is left in the pond. The water containing the soluble fluorides will sometimes seep from these ponds into streams and rivers.

In these prior art processes, when it has been desired to produce nitrate products, the acidulation has been carried out with nitric acid or a mixture of nitric and sulfuric acid. The problems with fluorine pollution remain the same, however, as the reaction proceeds in generally the same manner.

In recent years, both air and water pollution laws and regulations have become more stringent, are becoming even more so and are now being more rigorously enforced. Operating companies have thus had many pollution problems with fluorine emission into the atmosphere and with the by-product gypsum from these phosphoric acid plants. Thus, an important problem in the operation of these plants has resided in the methods for handling the mass amount of fluorine compounds which are liberated in the gaseous and water effluents from the plants. In some phosphate complexes from 10 to 30,000 ton per year of fluorine compounds may be liberated by various methods. It is estimated that in a typical wet process phosphoric acid plant a portion of the fluorides are evolved in the atmosphere in gaseous form such as hydrogen fluoride or silicon tetrafluoride which destroys vegetation and affects other facilities which are in close proximity to the producing plant if they are not scrubbed out and such scrubbing systems are not always efficient. A second portion of the fluorine is contained in the gypsum dumps and is leached into streams and rivers by rain water. The other portion of the fluorides is believed to be contained in the final product obtained from such operations and thus when the final products are fertilizers, they are added to the soil and can change the fluoride level thereof. It is only in recent years that studies have been made on the effects of fluorides contained in the final products and indications seem clear that they have a deterrent effect on the long range producing ability of the soil. See for example Kudzin et al., *Chem. Abs.*, 73, 870534 (1970).

There is a great deal of literature and patent art concerning attempts to remove the fluoride values from fluorine-containing phosphate rock in operation of a phosphoric acid plant as the art is replete with methods for suppressing the fluoride values in operation of the process or attempting to scrub the fluorine from effluent gases and waste water. For example, see U.S. Pats. 2,954,275 and 2,976,141 to Carothers et al. In these patents it was believed possible to concentrate most of the fluorides in the gypsum cake and the patents indicate that this was achieved by adding a suppressing amount of an alkali metal salt to the reaction. However, these processes were conducted in the presence of sulfuric acid in the acidulation reactor and the process had no effect on fluoride evolution during acidulation. Thus processes of this type have not become important commercially in efforts to overcome fluorine pollution in operation of phosphoric acid plants.

There are many other patents available in the phosphoric acid and the fluoride art which suggest the use of scrubbing and recycling systems in an effort to catch or convert the fluorides evolved so that as much as possible of the fluorine can be removed. Nevertheless, in all of these prior art approaches to the problem, there is never any provision made for disposing of the fluoride contained in the final product nor are there provisions made for obtaining good concentration of the fluoride in a substantially water-insoluble form in the gysum cake. The present invention provides a breakthrough in this area and for the first time suggests an approach to the operation of a phosphoric acid plant which can be conducted so as to be substantially free of fluorine pollution in the production of alkali metal nitrates and phosphoric acid.

SUMMARY OF THE INVENTION

It is accordingly one object of this invention to provide a process for the operation of an alkali metal nitrate/phosphoric acid plant in the substantial absence of fluoride pollution.

A further object of the invention is to provide a method for the operation of an alkali metal nitrate/phosphoric acid plant and the acidulation of fluorine-containing phosphate rock.

A still further object of the invention is to provide a method by which a fluoride-containing phosphate rock can be acidulated in the presence of an alkali metal sulfate and in the substantial absence of strong mineral acid in the reactor so that fluorides are contained in the gypsum cake and the reaction is conducted in the substantial absence of fluoride air and water pollution and provide a recovery of alkali metal nitrate and phosphoric acid products substantially free of fluoride contamination.

Other objects and advantages of the present invention will become apparent as the description thereof proceeds.

In satisfaction of the foregoing objects and advantages there is provided by this invention a method for the preparation of alkali metal nitrates and phosphoric acid substantially free from contamination with fluoride compounds comprising reacting a fluoride-containing phosphate rock with phosphoric acid which should contain some alkali metal ions to form a calcium phosphate mixture, and then reacting this mixture in the substantial absence of strong mineral acid and with an alkali metal sulfate or bisulfate salt to form a mixture of alkali metal dihydrogen phosphate, phosphoric acid and gypsum solids, removing the gysum solids, reacting the resulting filtrate with nitric acid to form an alkali metal nitrate and phosphoric acid, utilizing a portion of the phosphoric acid which may contain some alkali metal nitrate for recycle to the first stage for reaction with the phosphate rock and recovering the alkali metal nitrate. Also provided are methods for operating this process in a continuous manner and methods for the recovery of the nitrates from the phosphoric acid and providing a substantially fluoride-free product.

BRIEF DESCRIPTION OF THE DRAWING

Referring now to the drawing accompanying the application, it will be seen that it represents a diagrammatic flow sheet for conducting one embodiment of the process.

DESCRIPTION OF THE PREFERRED EMBODIMENTS

As pointed out above, this invention is concerned with a new method for the operation of an alkali metal nitrate/phosphoric acid plant and the preparation of alkali metal nitrate compounds, which process is conducted in the substantial absence of atmospheric, liquid or solid fluoride pollution. Thus, this process represents a substantial advance in the phosphoric acid art where fluorine pollution is a major problem and which, under the new and more stringent environmental laws, must be provided with a solution.

As is well known most of the commercially important phosphate ores mined in this country and particularly in Florida contain 3–4% fluorine after beneficiation. The element is a constituent of fluorapatite which is commonly expressed as $Ca_{10}F_2(PO_4)_6$ and may also be present as calcium fluosilicate ($CaSiF_6$). Silica is a component of phosphate rock and is usually also abundant in most grades of Florida rock that are commonly used in the production of wet process phosphoric acid. In usual processes for preparation of alkali metal nitrates the fluorine compounds in the phosphate rock react with nitric acid during the attack on the rock so that the fluorine appears in a vapor as hydrofluoric acid (HF), silicon tetrafluoride ($SiF_4$), or other gas and in the phosphoric acid as fluosilicic acid ($H_2SiF_6$) and/or fluosilicate salts or other forms. Acids from a rock low in silicon may also contain fluosilicic acid. As pointed out above, phosphoric acid plants have been an aggravating source of air and water pollution and the fluorides also turn up as pollutants in the final product fertilizers or other commercial products from these plants.

The present invention is considered to provide a substantial solution to the problem of acidulating phosphate rock with nitric acid and provides this solution by a method in which the fluoride-containing phosphate rock (e.g. fluorapatite) can be acidulated without the necessity of actually mixing strong mineral acid with the rock. The present invention also provides a process in which alkali metal nitrates and especially $KNO_3$ can be produced in a commercially attractive manner. The key to this novel process is to eliminate the use of strong acid in the acidulation of the phosphate rock, or in other words, the use of a strong acid such as sulfuric acid, nitric acid or hydrochloric acid is eliminated from the acidulation reaction. On the other hand, alkali metal sulfates or bisulfates which are used in the reaction will not generate volatile fluorides.

According to this invention, the fluoride-containing phosphate rock is initially reacted in an acidulation reactor with $H_3PO_4$ and preferably with recycle phosphoric acid which has some K or Na ions present which can complex with the fluorine to form a slurry of calcium phosphate (e.g. monocalcium phosphate) and the resulting mixture is then reacted of an additional alkali metal sulfate or bisulfate and in the absence of a strong acid. By the term strong acid is meant those acids which are ionized greater than 90% at a strength or concentration of 0.1 Normal. By this criteria, phosphoric acid and the alkali metal sulfate or bisulfate salts are considered to be moderately strong rather than strong acids. Under the same definition sulfuric acid, nitric acid, and hydrochloric acid, which are ionized at 0.1. Normal concentrations at 90%, 92% and 92%, respectively, are considered strong acids. Another criteria of defining acidic strength is by ionization constant. Thus the acids employed in the reactions of this invention are considered to have an ionization constant of less than about 0.40.

In this reaction the phosphate rock is reacted with sufficient phosphoric acid, fresh or recycle but which contains some alkali metal ions, e.g. about 1% to 25% by weight, to react with most or all the rock present and form a slurry or mixture of a calcium phosphate, usually monocalcium phosphate. The alkali metal ions in the phosphoric acid is to react or complex with the fluorine to prevent its evolution. Recycle phosphoric acid is very suitable as a reactant. A stoichiometric amount or excess of $H_3PO_4$ should be used and the reaction conducted at a temperature of about 40°–110° C. Under these moderate reaction conditions in the first stage, volatile fluoride evolution is minimized.

In a second stage, this mixture is then reacted with a stoichiometric amount or slight excess of up to 10% with an alkali metal sulfate or bisulfate salt to complete the conversion to a mixture of alkali metal dihydrogen phosphate, phosphoric acid and gypsum solids. In this reaction it is necessary to maintain the proper stoichiometry so that there are sufficient sulfate ions present to react with all the calcium in the $Ca_9(PO_4)_6$ portion of the rock except that theoretically combined with fluorine as $CaF_2$ in the rock.

The alkali metal sulfate or bisulfate salt reactant is in the form of an aqueous solution and includes both alkali metal sulfates and alkali metal hydrogen sulfates and is preferably of the formula $R_2SO_4$ wherein R is alkali metal (e.g. K or Na) or one R is hydrogen and the other R is alkali metal. Thus the sulfate reactant may be $KHSO_4$, $K_2SO_4$, $NaHSO_4$, $Na_2SO_4$ or mixtures thereof. Potassium hydrogen sulfate (KHSO) is a highly preferred reactant and is preferably prepared by the reaction of sulfuric acid and potassium chloride. Reaction at a temperature of 125°–300° C. with HCl evolution to provide a $KHSO_4$ solution is advantageous. The other salts falling within this formula, all of which are well known, may be obtained by similar reactions. These salts may be dissolved in wash water from the gypsum filtration for use in the reaction and are preferably about a 30–60 wt. percent aqueous solution. If a small amount of $H_2SO_4$ is contained in this reactant it may be effectively neutralized by reaction with a portion of the final product mixture of $H_3PO_4$ and $RNO_3$.

In this second stage of the reaction, the monocalcium phosphate mixture, still containing the fluorides, is reacted with the $R_2SO_4$ salt in an acidic aqueous medium at a temperature of about 40–110° C. In a preferred aspect of this reaction a slurry is recycled to provide an essentially complete reaction. Under these conditions, the materials interact to form a mixture of alkali metal phosphate ($RH_2PO_4$ where R is as above), phosphoric acid and gypsum solids. In a highly preferred procedure the $R_2SO_4$ solution is added slowly to maximize gypsum crystal growth so as to enhance filterability of the slurry.

After the reaction is completed, this mixture is transferred to a separator such as a continuous filter where the solid cake is removed to leave a resultant solution comprising phosphoric acid and the alkali metal dihydrogen phosphate. The solid gypsum cake removed from the separator contains the gypsum ($CaSO_4 \cdot 2H_2O$) and a large portion of the fluorides in an insoluble form in intimate admixture with the gypsum cake. The fluorides are believed to comprise a complex mixture of fluoride salts which, being in solid form, can be subsequently separated from the gypsum for use as desired. The separation of these fluorides can be achieved by solid separation techniques based on densities of the solids and standard beneficiation techniques. Suitable methods of separation are set forth in U.S. Pats. 2,954,275 and 2,976,141. Up to 95% of the fluorides originally in the rock may be found concentrated in the gypsum cake. No appreciable fluoride gas evolution will be noted during the reaction stages. Thus at this point, the fluorides have been essentially removed in the substantial absence of pollution problems.

The resulting solution from this separation, containing a mixture of phosphoric acid and the alkali metal dihydrogen phosphate ($RH_2PO_4$), is then passed to a nitric acid reactor for reaction with sufficient concentrated nitric acid to react with the phosphate present. A stoichiometric amount of nitric acid is preferably employed but not an excess of $HNO_3$ since all of its is to be reacted with the $RH_2PO_4$ salt.

In the nitric acid reactor, conducted under conditions ranging from room temperature (about 25° C.) to about 75° C., with good mixing, sufficient nitric acid is added to react with the $RH_2PO_4$ salt introduced. From this reaction, there is formed a slurry of $RNO_3$ salt, where R is alkali metal, and phosphoric acid. This slurry is then sent to a separator, e.g. a centrifuge, thickener, decanter, etc., in cooled condition. In the separator, most of the phosphoric acid is removed and recycled to the first stage reaction for reaction with phosphate rock. The phosphoric acid being recycled can also contain some $RNO_3$ which will not interfere in the reaction and in fact the alkali metal ions serve to complex with the fluorine present in the rock and prevent its evolution The solids from the separator comprise mainly the $RNO_3$ product together with the remaining phosphoric acid. If desired the $RNO_3$ can be separated as a solid product from the $H_3PO_4$. Alternatively a calculated mixture of the $RNO_3$, preferably $KNO_3$ if $KHSO_4$ or $K_2SO_4$ is used as a reactant, and $H_3PO_4$ can be processed in known manner to provide a high plant food N-P-K fertilizer.

Referring now to the drawing accompanying this application, it will be seen that there is shown a specific embodiment of the process when operated in a cyclic manner. In the drawing, a reactor 2 is provided for conducting the first stage acidulation, this reactor preferably being of the multichamber type or a series of reactors with internal recycle of a slurry of the reacting mixture. In this reactor the fluorine-containing phosphate rock from a suitable source is added via line 1 to the reactor 2. To this phosphate rock is added phosphoric acid from line 14 which is preferably recycled $H_3PO_4$ from a subsequent step in the reaction to form a slurry of monocalcium phosphate at a temperature of about 40–110° C. A preferred recycle phosphoric acid mixture comprises an aqueous mixture of $H_3PO_4$ which may contain a small amount of $RNO_3$ produced in the process. In this step, it is necessary that sufficient phosphoric acid be added to provide at least a stoichiometric amount so as to react with all the rock present and an excess of $H_3PO_4$ over the stoichiometric amount may be used.

This reacted slurry is then taken via line 3 to attack tank 4 where it is reacted with an aqueous slurry or solution of the $R_2SO_4$ salt added via line 5. This solution in a preferred embodiment is a 10–50 weight percent aqueous solution. In the reactor 4 the materials are reacted at a temperature of about 40–110° C. with slurry recycle to achieve complete reaction. A multi-chamber reactor or series of reactors is preferred for effecting the reaction.

The resulting slurry from reactor 4 is removed through line 6 to a separator or filter 7, preferably a continuous filter with wash water recycle from which a solid cake is removed via line 8. This solid cake contains the gypsum or calcium sulfate together with the insoluble fluorides contained in intimate admixture therewith. The fluorides may be separated from the gypsum cake in any desired manner as pointed out above.

The resulting solution is taken from the seprator 7 by line 9 and comprises a solution of phosphoric acid and alkali metal dihydrogen phosphate salt ($RH_2PO_4$). This solution is removed to reactor 10 where sufficient nitric acid is mixed therewith via line 11 to react with all the $RH_2PO_4$ salt present and form a slurry of $RNO_3$ salt in phosphoric acid. This reaction is operated with good mixing at a temperature ranging from room temperature (about 25° C.) up to about 75° C.

The resulting slurry is then removed via line 12 to mixer/separator 13 (e.g. a decanter, centrifuge, thickener, etc.) in cooled condition where a separation is made between the $RNO_3$ and phosphoric acid. In the mixer/decanter, it is highly preferred to continuously recycle a portion of the $RNO_3$ in order to maintain the proper concentrations of $RNO_3$ to $H_3PO_4$. This, of course, aids in recovery and recycle of the correct material amounts. The phoshporic acid removed, which may contain a small amount of $RNO_3$, is recycled via line 14 for reaction with the phosphate rock. Additional fresh $H_3PO_4$ may be added if necessary.

The solids from mixer/separator 13 are removed via line 15 and contain primarily $RNO_3$ in admixture with some phosphoric acid. As mentioned above, a complete separation for $RNO_3$ recovery may be made by filtration and drying or the $RNO_3/H_3PO_4$ in desired ratios may be worked up in known manner to provide a high plant food value N-P-K fertilizer when R is potassium. Moreover, the process provides an excellent route for the production of potassium nitrate or sodium nitrate.

In an alternative embodiment for conducting this process, the reaction slurry from reactor 4 could be passed through a thickener prior to filtering, the recovered solution forwarded directly to the nitric acid reactor 10 and the wet solids sent to separator or filter 7. This feature eliminates much of the recycle load in a continuous filter.

In the above-identified continuous process set forth in the drawing accompanying this application there are of course various ways to practice the process which would still utilize the principle of the process as disclosed and claimed herein. The important aspect to be appreciated regarding this process is that for the first time there is provided a procedure by which an alkali metal nitrate/phosphoric acid plant can be operated in the substantial absence of fluorine pollution. In the process described herein, there is no appreciable ommission of fluorine gases during the acidulation reactions and up to 95% of the fluoride values may be concentrated in the gypsum cake and thus effectively removed from the system.

The reaction of this invention has been described with use of an $R_2SO_4$ salt reactant. However, the process is considered particularly useful when this reactant is $KHSO_4$ and the final product is potassium nitrate.

It is pointed out in this specification that the problems of fluorine pollution are minimized because of the elimination of direct contact of a strong acid with fluorine-containing phosphate rock as direct contact with a strong acid such as $HNO_3$ causes evolution of volatile fluorides. However, the unique procedure of this invention affects the acidulation reaction in two steps so that direct contact with strong acid is eliminated and the fluorides are substantially concentrated in the gypsum cake. Thus the heart of the invention from a pollution aspect results from the discovery that fluorides are not evolved in any significant amount by contact of phosphate rock with relatively weak acids such as $H_3PO_4$ and $KHSO_4$ or other $R_2SO_4$ salts under the relatively modest reaction conditions employed.

The following example is provided to further illustrate the invention but it is not to be considered as limited thereto. In this example and throughout the specification, parts are by weight unless otherwise indicated.

EXAMPLE

A recycle $H_3PO_4$ solution containing 1391.6 parts of $H_3PO_4$ and 4562 parts of water is reacted with 1260 parts of phosphate rock feed which analyzes 33.9% $P_2O_5$=74% BPL and had a $CaO/P_2O_5$ weight ratio of 1.33. After approximately three hours of reaction time with good mixing at 80° C. during which 75-90% of the $P_2O_5$ in the rock is solubilized, 1374.6 parts of solid $KHSO_4$ dissolved in 2080 parts of make-up wash water from the gypsum filtration is added gradually to help maximize gypsum crystal growth. After an additional two to three hours reaction period at 80° C., the gypsum is readily filtered in a continuous filter with wash water recycle. After washing the filter cake with 2080 parts of water (which is subsequently recycled to dissolve additional $KHSO_4$), 2100 parts of gypsum cake was recovered which contains the fluorides and silica from the original rock. The filtrate from the gypsum separation contains approximately 1374.6 parts of $KH_2PO_4$ plus 989.8 parts of $H_3PO_4$ in 6093 parts of water. This filtrate is then reacted with 1036 parts of 40° Bé=61.4% nitric acid at a temperature of 50° C. This reaction is completed within 0.5 hours and 2416.3 parts of $KNO_3$ designated Recycle B from a subsequent step is added to result in a product mix containing a total of 3437.4 parts of $KNO_3$ and 1979.6 parts of phosphoric acid in 6493 parts of water. The concentration of products is thus 45.5%. This homogeneous reaction slurry is split into two parts. The smaller portion of approximately 3150 parts contains a total of 530 parts $H_3PO_4$ and 920 parts of $KNO_3$ and represents the desired 4-12-13.5 K-P-K final product for a recovery of aproximately 90% of all of the NPK materials involved. The larger portion contains 1391.6 parts of $H_3PO_4$ and 2416.3 parts of $KNO_3$ in 4562 parts of water. The solid $KNO_3$ is separated and is recycled to the nitric acid reactor. The liquid from this separation is then utilized in the phosphate rock attack in the first stage. There was no detectable fluoride evolution during the digestion stages.

The invention has been illustrated herein with reference to certain preferred embodiments. However, as obvious variations thereon will appear to those skilled in the art the invention is not to be considered as limited thereto.

What is claimed is:

1. A process for the production of alkali metal nitrates and phosphoric acid comprising the steps of reacting phosphate rock with a stoichiometric amount or up to an excess of about 10% of phosphoric acid which contains about 1% to about 25% by weight of alkali metal ions at a temperature of about 40°-110° C. to form a monocalcium phosphate mixture, reacting this mixture in a second stage with an acidic aqueous medium containing at least a stoichiometric amount of a sulfate of the formula $R_2SO_4$, wherein R is alkali metal or one R is hydrogen and the other R is alkali metal, at a temperature of about 40°-110° C., separating a solid gypsum cake and recovering a resulting mixture of alkali metal dihydrogen phosphate, where R is alkali metal, and phosphoric acid, reacting this mixture at a temperature of about 25°-75° C. with nitric acid to form an alkali metal nitrate where R is alkali metal, and phosphoric acid, and recovering the alkali metal nitrate and phosphoric acid.

2. A process according to claim 1 wherein the sulfate salt is selected from the group consisting of potassium sulfate, sodium sulfate, potassium hydrogen sulfate, sodium hydrogen sulfate and mixtures thereof.

3. A process according to claim 2 wherein the first and second stage reactions are conducted in separate reactors with continuous recycle of the reacting slurry in each reactor.

4. A process according to claim 3 wherein the $RNO_3$ nitrate is removed from the phosphoric acid, and a portion of the latter is recycled to the first stage for reaction with phosphate rock.

5. A process according to claim 4 wherein a stoichiometric amount of nitric acid is used, based on the amount of alkali metal dihydrogen phosphate present.

6. A process according to claim 5 wherein the $R_2SO_4$ salt is $KHSO_4$, and the final nitrate product is $KNO_3$.

7. A continuous process for the preparation of an alkali metal nitrate and phosphoric acid, comprising the steps of reacting phosphate rock with a stoichiometric amount or excess of up to 10% of phosphoric acid which contains about 1% to about 25% by weight of alkali metal ions in a first stage at a temperature of about 40°-110° C. to form a monocalcium phosphate mixture, reacting this mixture with an acidic aqueous medium containing at least a stoichiometric amount of a sulfate of the formula $R_2SO_4$, wherein R is alkali metal or one R is hydrogen and the other R is alkali metal, in a second stage at a temperature of about 40°-110° C. to form a reacting slurry of phosphoric acid, alkali metal dihydrogen phosphate, gypsum and fluorides, separating a solid gypsum cake from the system which contains at least a portion of the insoluble fluorides, and provide a resulting filtrate comprising phosphoric acid and alkali metal dihydrogen phosphate, reacting this resulting filtrate with nitric acid at a temperature of about 25°-75° C. to form a mixture of alkali metal nitrate and phosphoric acid, separating the solid alkali metal nitrate from the phosphoric acid and recycling at least a portion of the phosphoric acid to the first stage reaction.

8. A process according to claim 7 wherein the sulfate salt is selected from the group consisting of potassium sulfate, sodium sulfate, potassium hydrogen sulfate, sodium hydrogen sulfate and mixtures thereof.

9. A process according to claim 8 wherein the first and second stage reactions are conducted in separate reactors with continuous recycle of the reacting slurry in each reactor.

10. A process according to claim 9 wherein the $R_2SO_4$ salt is prepared by the reaction of alkali metal chloride and sulfuric acid at a temperature of 125°-300° C. with evolution of hydrogen chloride and the salt is dissolved in water to form a 30-60 weight percent acidic aqueous solution.

11. A process according to claim 10 wherein the slurry from the second stage reaction is passed to a thickener prior to separation, the recovered liquid is passed directly to the nitric acid reactor and the wet solids are passed to the separator.

12. A process according to claim 11 wherein the gypsum cake is filtered in a continuous filter with continuous water wash.

13. A process according to claim 12 wherein the $R_2SO_4$ salt is $KHSO_4$ and the final solid nitrate product is $KNO_3$.

References Cited

UNITED STATES PATENTS

| | | | |
|---|---|---|---|
| 3,653,872 | 4/1972 | Guery | 423—313 X |
| 3,663,168 | 5/1972 | Rubin et al. | 423—319 |

FOREIGN PATENTS

| | | | |
|---|---|---|---|
| 1,299,612 | 7/1969 | Germany | 423—320 |

OSCAR R. VERTIZ, Primary Examiner

G. A. HELLER, Assistant Examiner

U.S. Cl. X.R.

423—319, 395

UNITED STATES PATENT OFFICE
CERTIFICATE OF CORRECTION

Patent No. 3,840,640　　　　　　　　　Dated October 8, 1974

Inventor(s) Erhart K. Drechsel

It is certified that error appears in the above-identified patent and that said Letters Patent are hereby corrected as shown below:

Column 2, line 21, "ton" should be --tons--;

Column 4, line 31, "of" should be --with--;

Column 4, line 59, "with" should be --of--;

Column 4, line 75, "(KHSO)" should be --$(KHSO_4)$--;

Column 5, line 65, after "evolution" insert --.--;

Column 7, line 63, "K-P-K" should be --N-P-K--.

Signed and sealed this 7th day of January 1975.

(SEAL)
Attest:

McCOY M. GIBSON JR.　　　　　　　C. MARSHALL DANN
Attesting Officer　　　　　　　　Commissioner of Patents